UNITED STATES PATENT OFFICE.

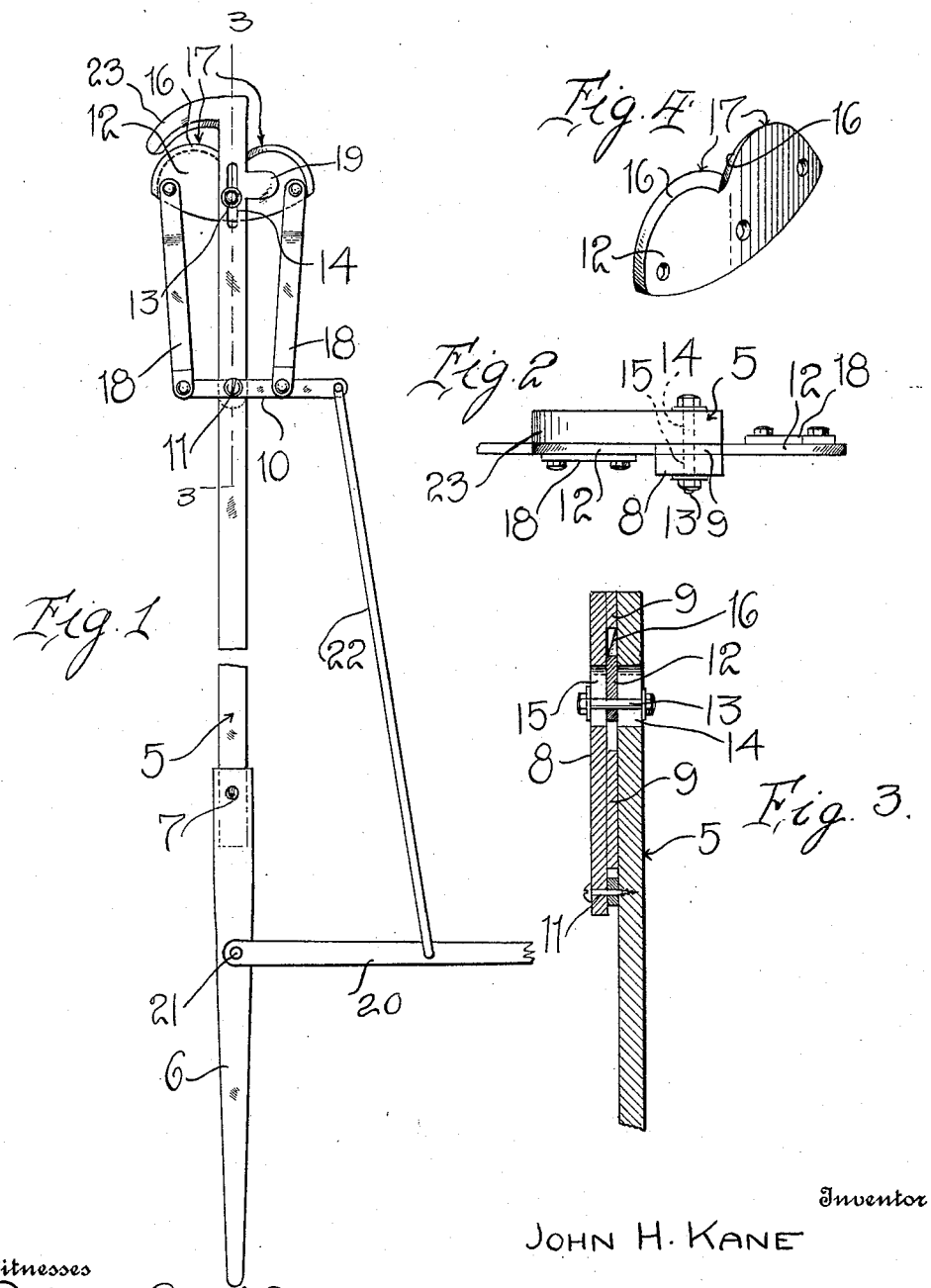

JOHN H. KANE, OF WICHITA, KANSAS.

PRUNING DEVICE.

1,162,369.   Specification of Letters Patent.   Patented Nov. 30, 1915.

Application filed January 23, 1915. Serial No. 3,985.

*To all whom it may concern:*

Be it known that I, JOHN H. KANE, a citizen of the United States, residing at Wichita, in the county of Sedgwick and State of Kansas, have invented certain new and useful Improvements in Pruning Devices, of which the following is a specification, reference being had to the accompanying drawings.

This invention relates to an improved pruning device, and has for its primary object to provide a device for pruning trees, which is so constructed that an effective shearing action may be obtained to quickly and easily cut the limb or branch from the tree.

The invention has for another and more particular object to provide an improved mounting and construction of double-cutting knife having a rounded cutting edge, an opposed limb engaging arm on the pole with which the cutting edge of the knife coacts to perform a shearing or cutting action, and means on the pole of the implement for actuating the knife.

The invention has for a further general object to improve and simplify the construction of devices of the above character whereby the same are rendered strong and durable in construction and highly convenient and serviceable in practical use.

With the above and other objects in view, my invention consists in the novel features of construction, combination, and arrangement of parts to be hereinafter more fully described, claimed, and illustrated in the accompanying drawing, in which, Figure 1 is a side elevation of a pruning implement constructed in accordance with the preferred embodiment of my invention; Fig. 2 is an end elevation; Fig. 3 is a section taken on the line 3—3 of Fig. 1; and Fig. 4 is a detail perspective view of the double pruning knife.

Referring in detail to the drawing, 5 designates a pole which may be of any desired length and is preferably of rectangular form in cross-section. The handle member 6 is provided with a socket in one end to receive said pole, said handle carrying the set screw 7 for binding engagement with the handle to securely hold the pole in connection therewith.

Upon the outer end of the pole 5, the longitudinally extending bar 8 is arranged and spaced from said pole by the blocks 9. The inner end of the bar 8 extends inwardly of the inner spacing block 9 and between the same and the pole 5, the lever 10 is disposed. This lever is loosely engaged upon the pivot screw or bolt 11 which extends through the end of the bar 8 and is threaded in the pole 5. The pruning knife, indicated at 12, is arranged between the pole and the bar 8, and a pin 13 is centrally fixed in said cutting knife.

Upon reference to Fig. 4 of the drawing, it will be observed that one edge of the cutting knife 12 describes two substantially semi-circular curves which meet at the longitudinal center of the blade. Along these two curved edges of the knife blade, the same is chamfered or beveled in relatively opposite directions, as indicated at 16, whereby sharp cutting edges 17 are produced, said cutting edges being out of alinement with each other, as will be clearly seen from reference to Fig. 2. To the ends of this double-cutting blade, the outer ends of link bars 18 are connected, said bars being preferably forked or bifurcated to straddle the knife blade. The other ends of said links are similarly formed and pivotally connected to the lever 10 upon opposite sides of its pivot 11. Upon the handle 6 of the implement, the operating lever 20 is pivoted at one end, as at 21, and is connected by a wire rod 22 to the lever 10. It will thus be obvious that, in the manipulation of the lever 20, the double-cutting blade is oscillated upon the outer end of the pole. One of the cutting edges of this blade is adapted to coöperate with the sharpened edge of the curved arm 23 which is formed upon the end of the pole 5. A lip or lug 19 extends laterally from the bar 5 over the cutting blade and prevents said blade from riding over the inner edge of the arm 23. In the use of the device, it will be understood that the inner sharpened edge of this arm is engaged with the limb or branch to be cut from the tree. By now moving the operating lever 20 in the proper direction, the opposed cutting edge 17 of the double-cutting blade is caused to engage with the limb, thus severing the same.

From the foregoing description, taken in connection with the accompanying drawing, the construction, manner of operation, and several advantages of my invention will be clearly and fully understood. While the implement is exceedingly simple in its construction, it is nevertheless, highly efficient in actual operation and provides means whereby a large number of trees may be quickly pruned or trimmed, with a minimum of manual labor. When one of the cutting edges 17 of the pruning blade becomes dulled, the other cutting edge of said blade may be used. The cutting blade may be very easily and quickly removed and properly sharpened when necessary. Owing to the fact that the use of springs and similar frail elements which are liable to easy derangement, is avoided, it will be apparent that the device, as a whole, is exceedingly durable in construction.

While I have shown and described the preferred construction of the several elements employed, it is to be understood that the same is susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

1. A pruning implement including a pole provided with a laterally extending stationary knife blade on one end, a cutting blade pivotally mounted upon the pole and having its edge opposed to the edge of said stationary blade, a lever pivotally mounted adjacent one of its ends upon said pole in spaced relation to said blade, link members pivotally connected to the opposite ends of the blade and to said lever in equidistant relation to the pivot of the latter, a handle member fulcrumed at one end upon the pole, and a longitudinally extending obliquely inclined rod pivotally connected to one end of said lever in spaced relation to the contiguous link member and having its other end pivotally connected to said handle member.

2. A pruning implement including a pole having a laterally extending, curved, stationary knife blade on one end, a cutting blade pivotally mounted intermediate of its ends upon the pole and having its edge opposed to the edge of the stationary knife blade, a bearing lug for the cutting blade projecting from the pole in an opposite direction to said stationary cutting blade, a lever fulcrumed adjacent one of its ends to the pole in spaced relation to the cutting blade, links pivotally connected at their inner ends to the lever in equidistantly spaced relation to the fulcrum thereof and extending outwardly in divergent relation to the pole and having their outer ends pivotally connected to the opposite ends of said cutting blade, a handle member pivotally mounted at one end upon the pole, and an obliquely inclined rod pivotally connected at one of its ends to the handle member and having its other end connected to one end of said lever.

In testimony whereof I hereunto affix my signature in the presence of two witnesses.

JOHN H. KANE.

Witnesses:
S. BURT SWALLOW,
JAMES J. WRIGHT.

Copies of this patent may be obtained for five cents each, by addressing the "Commissioner of Patents, Washington, D. C."